United States Patent
Jin et al.

(10) Patent No.: US 9,148,868 B2
(45) Date of Patent: Sep. 29, 2015

(54) METHOD, APPARATUS, AND SYSTEM FOR LOCATION UPDATE

(71) Applicant: Huawei Device Co., Ltd., Shenzhen (CN)

(72) Inventors: Hui Jin, Beijing (CN); Rui Wang, Shenzhen (CN)

(73) Assignee: Huawei Devoce Co., Ltd., Shenzhen (CN)

(*) Notice: Subject to any disclaimer, the term of this patent is extended or adjusted under 35 U.S.C. 154(b) by 153 days.

(21) Appl. No.: 14/145,286

(22) Filed: Dec. 31, 2013

(65) Prior Publication Data

US 2014/0113658 A1   Apr. 24, 2014

Related U.S. Application Data

(63) Continuation of application No. PCT/CN2011/079626, filed on Sep. 14, 2011.

(51) Int. Cl.
*H04W 64/00* (2009.01)
*H04W 56/00* (2009.01)
(Continued)

(52) U.S. Cl.
CPC ............ *H04W 64/00* (2013.01); *H04W 56/001* (2013.01); *H04W 60/005* (2013.01); *H04W 56/00* (2013.01); *H04W 88/06* (2013.01); *Y02B 60/50* (2013.01)

(58) Field of Classification Search
None
See application file for complete search history.

(56) References Cited

U.S. PATENT DOCUMENTS

| 8,521,170 B2 * | 8/2013 | Buckley et al. ............... 455/445 |
| 2004/0017798 A1 * | 1/2004 | Hurtta et al. .................. 370/352 |
| 2005/0186961 A1 * | 8/2005 | Aikawa et al. ............. 455/435.1 |

(Continued)

FOREIGN PATENT DOCUMENTS

| CN | 101166323 A | 4/2008 |
| CN | 101217746 A | 7/2008 |

(Continued)

OTHER PUBLICATIONS

"3rd Generation Partnership Project; Technical Specification Group Services and System Aspects; Circuit Switched (CS) fallback in Evolved Packet System (EPS); Stage 2 (Release 10)," 3GPP TS 23.272, V10.5.0, Technical Specification, Sep. 2011, 79 pages.

(Continued)

*Primary Examiner* — Charles Appiah
*Assistant Examiner* — Margaret G Mastrodonato
(74) *Attorney, Agent, or Firm* — Conley Rose, P.C.; Grant Rodolph; Nicholas K. Beaulieu

(57) ABSTRACT

A method, an apparatus, and a system for a location update are provided. When detecting that a location update needs to be performed in a first mobile communication network, a request message including instruction information is sent to a mobile management device in the first mobile communication network, so that the mobile management device in the first mobile communication network sends a request message to a mobile management device in a second mobile communication network when executing the location update, so as to trigger the mobile management device in the second mobile communication network to reset a periodic update timer, which implements that a location update of a single-card dual-standby user equipment is synchronously performed in the first mobile communication network and in the second mobile communication network.

12 Claims, 6 Drawing Sheets

(51) Int. Cl.
*H04W 60/00* (2009.01)
*H04W 88/06* (2009.01)

(56) References Cited

U.S. PATENT DOCUMENTS

| | | | |
|---|---|---|---|
| 2008/0132252 | A1 | 6/2008 | Altman et al. |
| 2009/0245206 | A1* | 10/2009 | Liu ............................... 370/331 |
| 2011/0269468 | A1* | 11/2011 | Sundell et al. ................. 455/436 |
| 2014/0024368 | A1* | 1/2014 | Jin et al. ......................... 455/436 |

FOREIGN PATENT DOCUMENTS

| | | |
|---|---|---|
| CN | 102026366 A | 4/2011 |
| CN | 102137459 A | 7/2011 |
| CN | 102158934 A | 8/2011 |
| WO | 2009081268 A1 | 7/2009 |
| WO | 2011053824 A2 | 5/2011 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 10)," 3GPP TS 24.301, V10.3.0, Technical Specification, Jun. 15, 2011, 316 pages.

3rd Generation Partnership Project; Technical Specification Group Core Network and Terminals; Mobility Management Entity (MME)—Visitor Location Register (VLR) SGs Interface Specification (Release 10), 3GPP TS 29.118, V10.4.0, Technical Specification, Jun. 14, 2011, 61 pages.

Foreign Communication From a Counterpart Application, PCT Application No. PCT/CN2011/079626, English Translation of International Search Report dated Jul. 12, 2012, 3 pages.

Foreign Communication From a Counterpart Application, PCT Application No. PCT/CN2011/079626, English Translation of Written Opinion dated Jul. 12, 2012, 8 pages.

Foreign Communication From a Counterpart Application, Chinese Application No. 201180002586.X, Chinese Office Action dated May 22, 2013, 10 pages.

Foreign Communication From a Counterpart Application, European Application No. 11795214.3, Extended European Search Report dated Jul. 8, 2014, 12 pages.

Partial English Translation and Abstract of Chinese Patent Application No. CN101217746A, Jul. 12, 2014, 5 pages.

Partial English Translation and Abstract of Chinese Patent Application No. CN101166323A, Part 1, Feb. 15, 2014, 5 pages.

Partial English Translation and Abstract of Chinese Patent Application No. CN101166323A, Part 2, Feb. 15, 2014, 3 pages.

* cited by examiner

METHOD, APPARATUS, AND SYSTEM FOR LOCATION UPDATE

CROSS-REFERENCE TO RELATED APPLICATION

This application is a continuation of international Application No. PCT/CN2011/079626, filed on Sep. 14, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to a communications technologies, and in particular, to a method, an apparatus, and a system for a location update.

BACKGROUND

With the development of mobile communications technologies, based on the second-generation (2G) mobile communication network and the third-generation (3G) mobile communication network, a mobile communication network with higher and higher transmission rate, such as, a fourth-generation (4G) mobile communication network, is widely applied increasingly. However, in a process of developing the high-speed mobile communication network such as the 4G mobile communication network, limited by various conditions, the existing low-speed mobile communication network cannot be completely upgraded to a new high-speed mobile communication network in a short time. Therefore, the foregoing high-speed mobile communication networks coexist with the existing low-speed mobile communication networks for a long time. Because a single-card dual-standby user equipment (UE) resides in two mobile communication networks, the single-card dual-standby user equipment needs to execute, in the two mobile communication networks, a location update caused by a location change and a location update caused by timeout of a periodic update timer.

However, in a period after the location update caused by the location change is executed in one mobile communication network, the single-card dual-standby user equipment may also need to execute, in the other mobile communication network, the location update caused by the timeout of the periodic update timer. In this way, the single-card dual-standby user equipment is continually activated to execute the location update, resulting in unnecessary electric energy loss of the single-card dual-standby user equipment.

SUMMARY

Embodiments of the present invention provide a method, an apparatus, and a system for a location update, which are used to reduce unnecessary electric energy loss of a single-card dual-standby user equipment.

In one aspect, a location update method is provided, which includes: when detecting that a location update needs to be performed in a first mobile communication network, sending a first request message including instruction information to a mobile management device in the first mobile communication network, so that the mobile management device in the first mobile communication network sends a second request message to a mobile management device in a second mobile communication network when executing the location update according to the instruction information, where the second request message enables the mobile management device in the second mobile communication network to reset a periodic update timer and send a first accept message including a periodic update timer reset instruction of the second mobile communication network to the mobile management device in the first mobile communication network; receiving a second accept message sent by the mobile management device in the first mobile communication network, where the second accept message includes the periodic update timer reset instruction of the second mobile communication network; and resetting the periodic update timer of the second mobile communication network according to the periodic update timer reset instruction of the second mobile communication network.

In another aspect, a location update method is provided, which includes: receiving a first request message including instruction information, where the first request message is sent by a single-card dual-standby user equipment when detecting that a location update needs to be performed in a first mobile communication network; executing the location update according to the instruction information, and sending a second request message to a mobile management device in a second mobile communication network, so that the mobile management device in the second mobile communication network resets a periodic update timer; receiving a first accept message sent by the mobile management device in the second mobile communication network, where the first accept message includes a periodic update timer reset instruction of the second mobile communication network; and sending a second accept message including the periodic update timer reset instruction of the second mobile communication network to the single-card dual-standby user equipment, so that the single-card dual-standby user equipment resets the periodic update timer of the second mobile communication network according to the periodic update timer reset instruction of the second mobile communication network.

In another aspect, a single-card dual-standby user equipment is provided, which includes: a radio frequency transceiver; and at least one processor coupled to the radio frequency transceiver, where the processor is configured to, when detecting that a location update needs to be performed in a first mobile communication network, trigger the radio frequency transceiver to send a first request message including instruction information to a mobile management device in the first mobile communication network, so that the mobile management device in the first mobile communication network sends a second request message to a mobile management device in a second mobile communication network when executing the location update according to the instruction information, where the second request message enables the mobile management device in the second mobile communication network to reset a periodic update timer and send a first accept message including a periodic update timer reset instruction of the second mobile communication network to the mobile management device in the first mobile communication network; where the processor is further configured to, when the radio frequency transceiver receives a second accept message including the periodic update timer reset instruction of the second mobile communication network and sent by the mobile management device in the first mobile communication network, reset the periodic update timer of the second mobile communication network according to the periodic update timer reset instruction of the second mobile communication network.

In another aspect, a mobile management device is provided, which includes: a radio frequency transceiver; and at least one processor coupled to the radio frequency transceiver, where the processor is configured to, when the radio frequency transceiver receives a first request message including instruction information, where the first request message is sent by a single-card dual-standby user equipment when detecting that a location update needs to be performed in a first mobile communication network, execute the location update according to the instruction information, and trigger the radio frequency transceiver to send a second request message to a mobile management device in a second mobile communication network, so that the mobile management device in the second mobile communication network resets a periodic update timer; where the radio frequency transceiver is configured to send a second accept message including a periodic update timer reset instruction of the second mobile communication network to the single-card dual-standby user equipment when receiving a first accept message including the periodic update timer reset instruction of the second mobile communication network and sent by the mobile management device in the second mobile communication network, so that the single-card dual-standby user equipment resets the periodic update timer of the second mobile communication network according to the periodic update timer reset instruction of the second mobile communication network.

In another aspect, a location update system is provided, which includes the foregoing single-card dual-standby user equipment and the foregoing mobile management device.

It can be known from the foregoing technical solutions that, through the embodiments of the present invention, it is implemented that a location update of the single-card dual-standby user equipment is synchronously performed in the first mobile communication network and in the second mobile communication network, which can avoid a problem in the prior art that the single-card dual-standby user equipment is continually activated to execute the location update, thereby effectively reducing unnecessary electric energy loss of the single-card dual-standby user equipment.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. The accompanying drawings in the following description are merely some embodiments of the present invention, and persons of ordinary skill in the art can further derive other drawings according to these accompanying drawings without making creative efforts.

DETAILED DESCRIPTION

To make the objectives, technical solutions, and advantages of the embodiments of the present invention clearer, the technical solutions according to the embodiments of the present invention are clearly and completely described in the following with reference to the accompanying drawings in the embodiments of the present invention. The embodiments in the description are merely a part rather than all of the embodiments of the present invention. All other embodiments obtained by persons of ordinary skill in the art based on the embodiments of the present invention without making creative efforts shall fall within the protection scope of the present invention.

It should be noted that, a single-card dual-standby user equipment involved in the embodiments of the present invention includes, but is not limit to, a wireless hand-hold device, a mobile telephone, a smart cell phone, a portable device, a networking card, or a data card.

A location update involved in the embodiments of the present invention is that a user equipment must register in a new location area when the user equipment moves from one location area to another location area. That is to say, once the user equipment has a certain need or finds that a location area identity (LAI) in its memory and a received LAI of a current cell changes, the network must be informed of changing the location information which is of the user equipment and is stored in the network. This process is the location update. According to different identifications of the location update by the network, the location update may be classified into three types: a normal location update (that is, location update cross the location areas), a periodic location update, and an international mobile subscriber identification number (IMSI) attachment and separation (correspond to subscriber boot). For example, in a circuit domain of a Global System for Mobile Communications (GSM) or a Universal Mobile Telecommunications System (UMTS), a location of the single-card dual-standby user equipment is referred to as a location area, and correspondingly, in the circuit domain of the GSM or the UMTS, the location update of the single-card dual-standby user equipment is referred to as a location area update. In the Long Term Evolution (LTE), a location of the single-card dual-standby user equipment is referred to as a tracking area; and correspondingly, in the LTE, the location update of the single-card dual-standby user equipment is referred to as a tracking area update.

Figure 1:
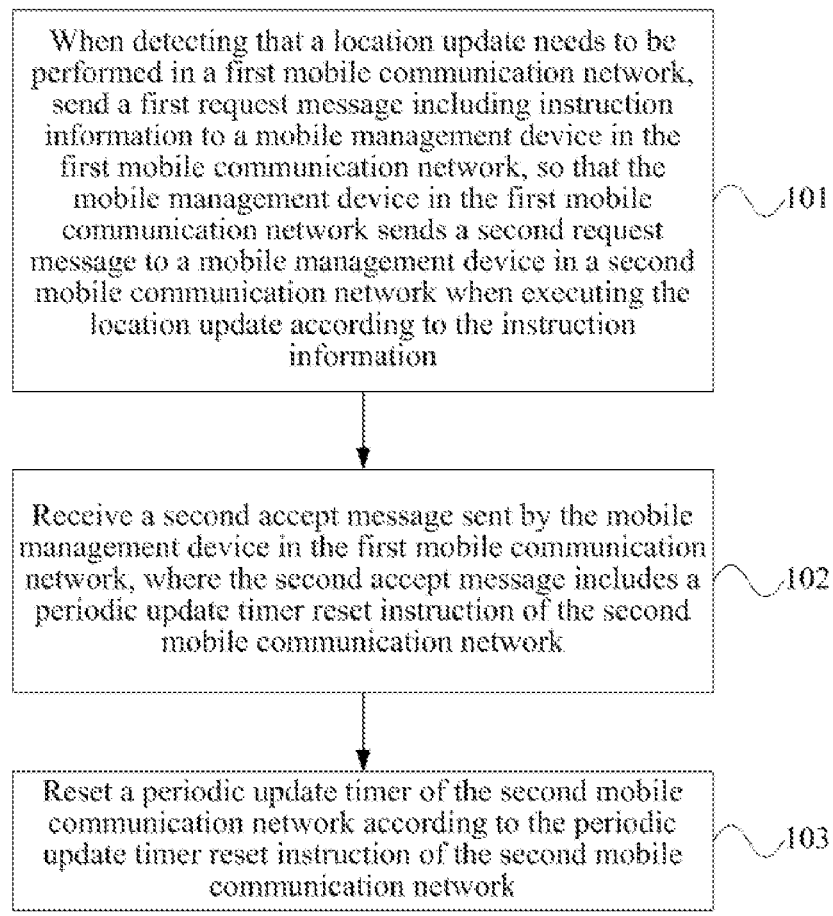
FIG. 1 is a schematic flow chart of a location update method according to an embodiment of the present invention.

FIG. 1 is a schematic flow chart of a location update method according to an embodiment of the present invention. As shown in FIG. 1, the location update method of this embodiment may include:

101: When detecting that a location update needs to be performed in a first mobile communication network, send a first request message including instruction information to a mobile management device in the foregoing first mobile communication network, so that the mobile management device in the first mobile communication network sends a second request message to a mobile management device in a second mobile communication network when executing the location update according to the instruction information, where the second request message enables the mobile management device in the second mobile communication network to reset a periodic update timer and send a first accept message including a periodic update timer reset instruction of the second mobile communication network to the mobile management device in the first mobile communication network.

Optionally, the first request message is a tracking area update (TAU) request message, and the second request message is a location update request message; or the first request message is a location area update (LAU) request message, and the second request message is a TAU request message.

The detecting that the location update needs to be performed in the first mobile communication network includes: detecting a location change in the first mobile communication network; or detecting timeout of a periodic update timer of the first mobile communication network.

Specifically, when detecting a location change of the single-card dual-standby user equipment in the first mobile communication network, the single-card dual-standby user equipment sends the first request message to the mobile management device in the first mobile communication network, where the location change includes a location area (LA) change and a tracking area (TA) change; or, when detecting timeout of the periodic update timer of the first mobile communication network, the single-card dual-standby user equipment sends the first request message to the mobile management device in the first mobile communication network.

Optionally, the foregoing instruction information may be carried in an update type field of the first request message or may also be carried in a newly added field. The foregoing instruction information may specifically be a certain letter and its combination, or a certain number and its combination, or a certain combination of a letter, a symbol, and a number, for example, which may be "LAI+TAI".

102: Receive a second accept message sent by the mobile management device in the first mobile communication network, where the second accept message includes a periodic update timer reset instruction of the second mobile communication network.

It should be noted that, the periodic update timer reset instruction may specifically be a certain letter and its combination, or a certain number and its combination, or a certain combination of a letter, a symbol, and a number, which is used for indicating the update of the periodic update timer.

103: Reset the periodic update timer of the second mobile communication network according to the periodic update timer reset instruction of the second mobile communication network.

The first mobile communication network is a 2G mobile communication network, and the second mobile communication network is a 3G mobile communication network; or the first mobile communication network is a 2G mobile communication network, and the second mobile communication network is a 4G mobile communication network; or the first mobile communication network is a 3G mobile communication network, and the second mobile communication network is a 4G mobile communication network; or the first mobile communication network is a 3G mobile communication network, and the second mobile communication network is a 2G mobile communication network; or the first mobile communication network is a 4G mobile communication network, and the second mobile communication network is a 3G mobile communication network; or the first mobile communication network is a 4G mobile communication network, and the second mobile communication network is a 2G mobile communication network.

It should be noted that, an executive subject of steps 101 to 103 is the single-card dual-standby user equipment.

Through the technical solutions provided in this embodiment, a location update of the single-card dual-standby user equipment is synchronously implemented in the first mobile communication network and in the second mobile communication network, which can avoid a problem in the prior art that the single-card dual-standby user equipment is continually activated to execute the location update, thereby effectively reducing unnecessary electric energy loss of the single-card dual-standby user equipment.

Figure 2:
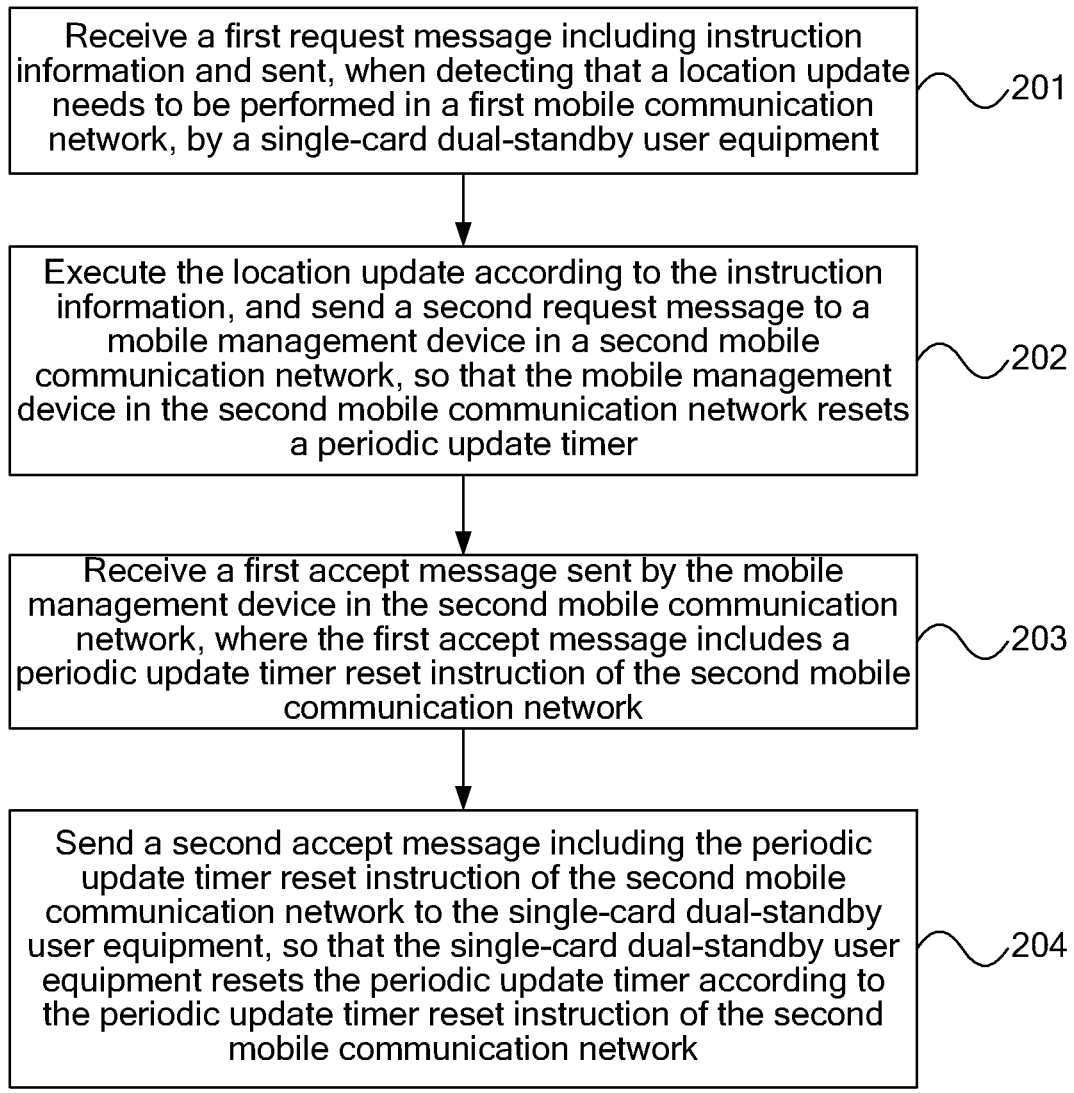
FIG. 2 is a schematic flow chart of a location update method according to another embodiment of the present invention.

FIG. 2 is a schematic flow chart of a location update method according to another embodiment of the present invention. As shown in FIG. 2, the location update method of this embodiment may include:

201: Receive a first request message including instruction information, where the first request message is sent by a single-card dual-standby user equipment when detecting that a location update needs to be performed in a first mobile communication network.

The detecting, by the single-card dual-standby user equipment, that the location update needs to be performed in the first mobile communication network includes: detecting, by the single-card dual-standby user equipment, a location change in the first mobile communication network; or detecting, by the single-card dual-standby user equipment, timeout of a periodic update timer of the first mobile communication network.

Specifically, when detecting a location change of the single-card dual-standby user equipment in the first mobile communication network, the single-card dual-standby user equipment sends the first request message to a mobile management device in the first mobile communication network, where the location change includes an LA change and a TA change; or, when detecting timeout of the periodic update timer of the first mobile communication network, the single-card dual-standby user equipment may send the first request message to the mobile management device in the first mobile communication network.

Optionally, the foregoing instruction information may be carried in an update type field of the first request message, or may also be carried in a newly added field.

202: Execute the location update according to the instruction information, and send a second request message to a mobile management device in a second mobile communication network, so that the mobile management device in the second mobile communication network resets a periodic update timer.

Optionally, the first request message is a tracking area update request message, and the second request message is a location update request message; or the first request message is a location area update request message, and the second request message is a tracking area update request message.

203: Receive a first accept message sent by the mobile management device in the second mobile communication network, where the first accept message includes a periodic update timer reset instruction of the second mobile communication network.

204: Send a second accept message including the periodic update timer reset instruction of the second mobile communication network to the single-card dual-standby user equipment, so that the single-card dual-standby user equipment resets the periodic update timer of the second mobile communication network according to the periodic update timer reset instruction of the second mobile communication network.

The first mobile communication network is a 2G mobile communication network, and the second mobile communication network is a 3G mobile communication network; or the first mobile communication network is a 2G mobile communication network, and the second mobile communication network is a 4G mobile communication network; or the first mobile communication network is a 3G mobile communication network, and the second mobile communication network is a 4G mobile communication network; or the first mobile communication network is a 3G mobile communication network, and the second mobile communication network is a 2G mobile communication network; or the first mobile communication network is a 4G mobile communication network, and the second mobile communication network is a 3G mobile communication network; or the first mobile communication network is a 4G mobile communication network, and the second mobile communication network is a 2G mobile communication network.

It should be noted that, the executive subject of steps 201 to 203 is the mobile management device of the first mobile communication network. It should be noted that, the mobile management device involved in this embodiment may be one of a mobility management entity (MME) or a mobile switch center (MSC), and may also have functions of MME and MSC at the same time.

Through the technical solutions provided in this embodiment, the location update of the single-card dual-standby user equipment is synchronously implemented in the first mobile communication network and in the second mobile communication network, which can avoid a problem in the prior art that the single-card dual-standby user equipment is continually activated to execute the location update, thereby effectively reducing unnecessary electric energy loss of the single-card dual-standby user equipment.

In order to make the method provided in the embodiment of the present invention clearer, an upgrade from a 3G mobile communication network to a 4G mobile communication network is taken as an example in the following. In a general case, a circuit switched (CS) domain of the single-card dual-standby user equipment may preferentially be attached to the 3G mobile communication network and preferentially carry CS domain services through the 3G mobile communication network, where a mobile management device of the CS domain in the 3G mobile communication network is an MSC. A packet switch (PS) domain of the single-card dual-standby user equipment may preferentially be attached to the 4G mobile communication network and preferentially carry PS domain services through the 4G mobile communication network, where a mobile management device of the PS domain in the 4G mobile communication network is an MME. Since the single-card dual-standby user equipment resides in the 3G mobile communication network and the 4G mobile communication network, respectively, the single-card dual-standby user equipment needs to execute a location update caused by a location change and a location update caused by timeout of a periodic update timer in the 3G mobile communication network and in the 4G mobile communication network, respectively.

Figure 3:
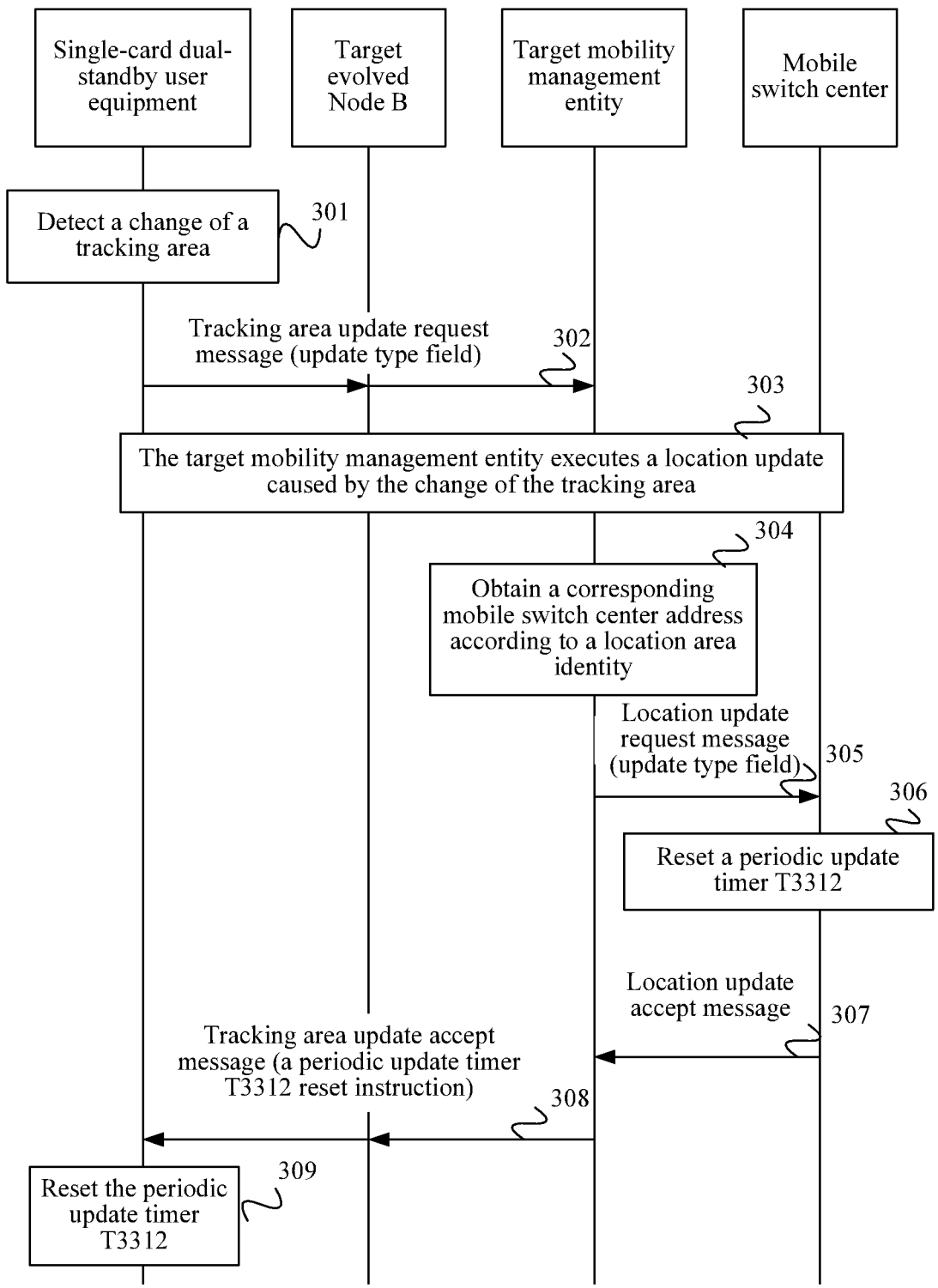
FIG. 3 is a schematic flow chart of a location update method according to another embodiment of the present invention.

FIG. 3 is a schematic flow chart of a location update method according to another embodiment of the present invention. In this embodiment, a CS domain of a single-card dual-standby user equipment is attached to a wideband code division multiple access (WCDMA) system, and a PS domain of the single-card dual-standby user equipment is attached to an LTE system. As shown in FIG. 3, the location update method of this embodiment may include:

301: The single-card dual-standby user equipment detects a change of a TA.

Alternatively, the single-card dual-standby user equipment detects timeout of a periodic update timer of the LTE system.

302: The single-card dual-standby user equipment sends a TAU request message to a target MME through the transfer of a target evolved Node B (eNB), where the tracking area update request message carries an update type field, and the update type field is used to instruct the target MME to execute a location update caused by the change of the tracking area (or timeout of the periodic update timer) and send a location update request message to an MSC.

For example, the update type field may be "TAI+LAI".

Alternatively, the tracking area update request message may further carry a newly added field, and the newly added field is used to instruct the target MME to send the location update request (Location Update Request) message to the MSC.

303: The target MME executes a location update caused by the change of the tracking area.

304: The target MME obtains a corresponding MSC address according to an LAI.

305: According to the obtained MSC address, the target MME sends a location update request message to an MSC corresponding to the MSC address, where the location update request message carries the update type field and is used to instruct the MSC to execute a location update caused by the timeout of the periodic update timer.

306: The MSC resets a periodic update timer T3312.

307: The MSC sends a location update accept message to the target MME.

308: The target MME sends a tracking area update accept message to the single-card dual-standby user equipment through the transfer of the target eNB, where the tracking area update accept message carries a periodic update timer T3312 reset instruction.

309: The single-card dual-standby user equipment resets the periodic update timer T3312.

Therefore, the single-card dual-standby user equipment also executes in the WCDMA system the location update caused by the timeout of the periodic update timer while executing in the LTE system the location update caused by the location change or the timeout of the periodic update timer.

In this embodiment, during a location update process caused by the change of the tracking area in the LTE system, the single-card dual-standby user equipment sends a tracking area update request message to the target MME in the LTE system, where the tracking area update request message includes WCDMA system location update instruction information, so that the target MME can send a location update request message to the MSC in the WCDMA system, so as to implement the synchronous location update of the single-card dual-standby user equipment in the LTE system and in the WCDMA system, which can avoid a problem in the prior art that the single-card dual-standby user equipment is continually activated to execute the location update, thereby effectively reducing unnecessary electric energy loss of the single-card dual-standby user equipment.

Figure 4:
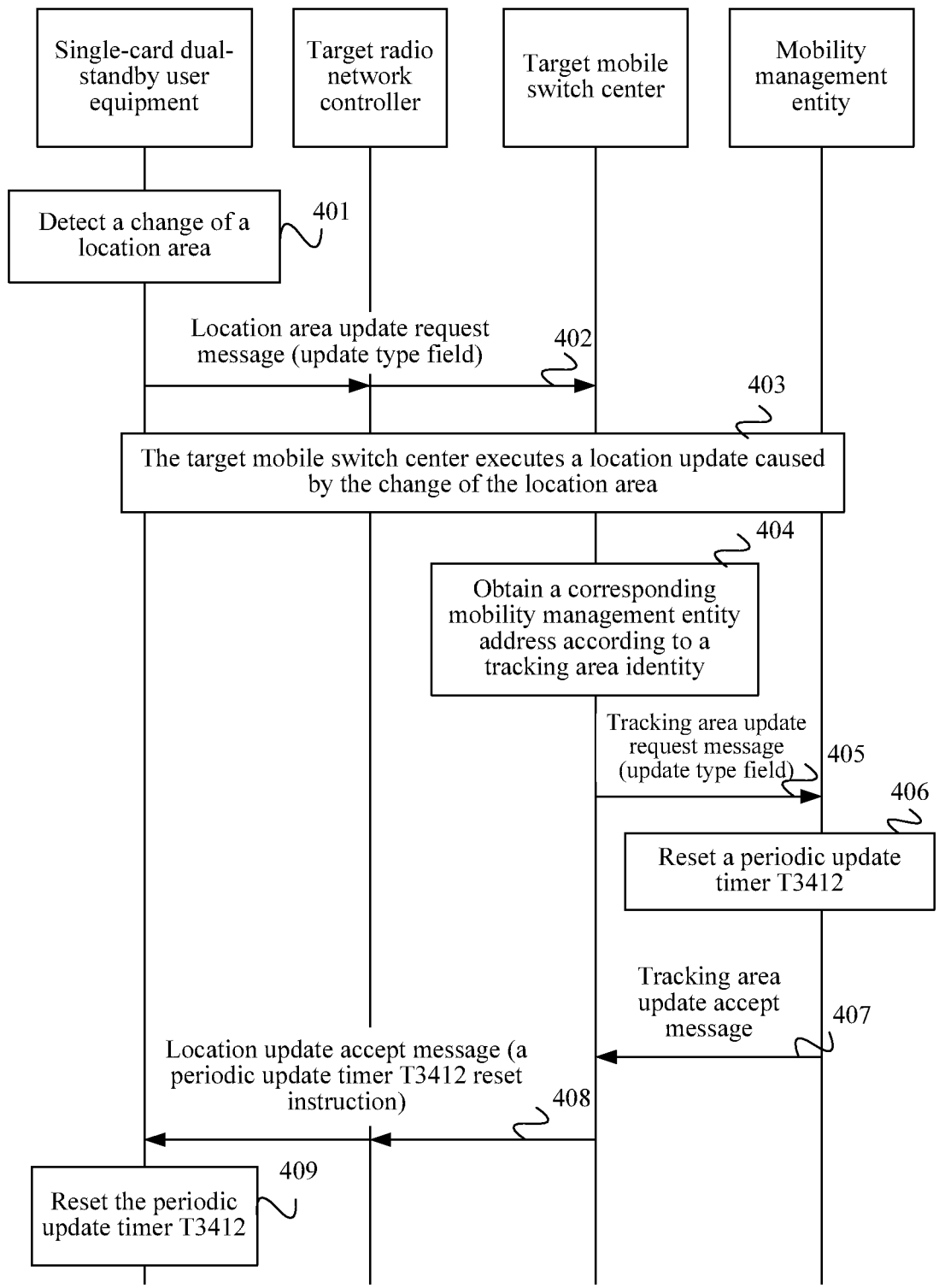
FIG. 4 is a schematic flow chart of a location update method according to another embodiment of the present invention.

FIG. 4 is a schematic flow chart of a location update method according to another embodiment of the present invention. In this embodiment, a CS domain of a single-card dual-standby user equipment is attached to a WCDMA system, and a PS domain of the single-card dual-standby user equipment is attached to an LTE system. As shown in FIG. 4, the location update method of this embodiment may include:

401: The single-card dual-standby user equipment detects a change of an LA.

Alternatively, the single-card dual-standby user equipment may also detect timeout of a periodic update timer of the WCDMA system.

402: The single-card dual-standby user equipment sends a location area update request message to a target MSC (an MSC of another mobile network) through the transfer of a target radio network controller (RNC), where the location area update request message carries an update type field, and the update type field is used to instruct the target MSC to execute a location update caused by the change of the location area (or the timeout of the periodic update timer) and send a tracking area update request message to an MME.

For example, the update type field may be "LAI+TAI".

Alternatively, the tracking area request message may further carry a newly added field, and the newly added field is used to instruct the target MSC to execute a location update caused by the change of the location area and send a tracking area update request message to the MME.

403: The target MSC executes a location update caused by the change of the location area.

404: The target MSC obtains a corresponding MME address according to a tracking area identity.

405: According to the obtained MME address, the target MSC sends a tracking area update request message to an MME corresponding to the MME address, where the tracking area update request message carries an update type field and is used to instruct the MME to execute a location update caused by the timeout of the periodic update timer.

406: The MME resets a periodic update timer T3412.

407: The MME sends a tracking area update accept message to the target MSC.

408: The target MSC sends a location update accept message to the single-card dual-standby user equipment through the transfer of a target RNC, where the message carries a periodic update timer T3412 reset instruction.

409: The single-card dual-standby user equipment resets the periodic update timer T3412.

Therefore, the single-card dual-standby user equipment also executes in the LTE system the location update caused by the timeout of the periodic update timer while executing in the WCDMA system the location update caused by the location change or the timeout of the periodic update timer.

In this embodiment, during a location update process caused by the change of the location area in the WCDMA system, the single-card dual-standby user equipment sends a location area update request message to the target MSC in the WCDMA system, where the location area update request message includes LTE system location update instruction information, so that the target MSC can send a tracking area update request message to the MME in the LTE system, so as to implement the synchronous location update of the single-card dual-standby user equipment in the WCDMA system and in the LTE system, which can avoid a problem in the prior art that the single-card dual-standby user equipment is continually activated to execute the location update, thereby effectively reducing unnecessary electric energy loss of the single-card dual-standby user equipment.

It should be noted that, for convenience of brief description, the foregoing method embodiments are described as a series of action combinations. However, it should be known by persons skilled in the art that the present invention is not limited by the order of the described actions because some steps may be performed in other orders or performed synchronously according to the present invention. Next, it should also be known by persons skilled in the art that the described embodiments in the specification all belong to exemplary embodiments, and the involved actions and modules are not necessarily required in the present invention.

In the foregoing embodiments, the description of each embodiment has its emphasis, and for a part that is not described in detail in a certain embodiment, reference may be made to the relevant description of other embodiments.

Figure 5:
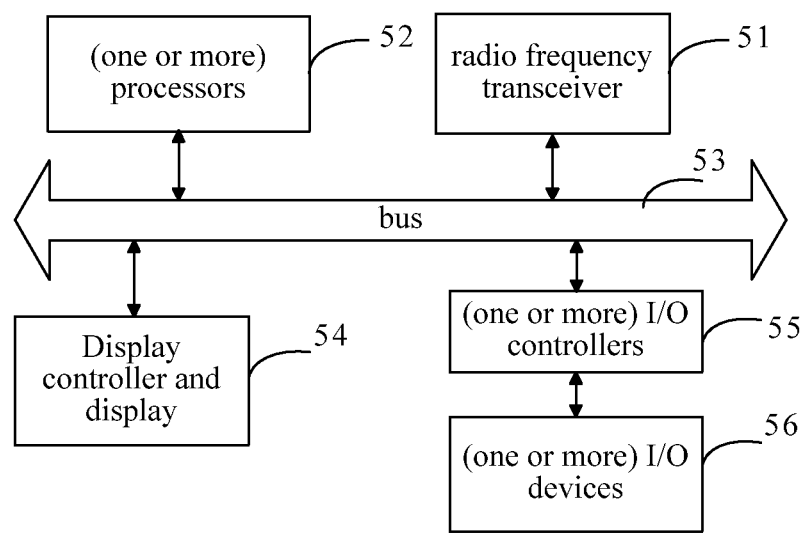
FIG. 5 is a schematic structural diagram of a single-card dual-standby user equipment according to another embodiment of the present invention.

FIG. 5 is a schematic structural diagram of a single-card dual-standby user equipment according to another embodiment of the present invention, where the single-card dual-standby user equipment may include: at least one processor 52 and a radio frequency transceiver 51 which are coupled to each other through a bus 53.

The single-card dual-standby user equipment may optionally include: a display controller and a display 54 that are coupled to other components through the bus 53; and one or more input/output (I/O) controllers 55 which are also coupled to the bus 53 to provide an interface to one or more input/output devices 56. The bus 53 may include one or more buses interconnected through various bridges, controllers, and/or adapters known in the art. An input/output device 56 may include a key area, a keyboard, a controller of a cursor, or a touchscreen.

The single-card dual-standby user equipment of this embodiment includes: a radio frequency transceiver 51; and at least one processor 52 coupled to the radio frequency transceiver 51, where the processor 52 is configured to, when detecting that a location update needs to be performed in a first mobile communication network, trigger the radio frequency transceiver 51 to send a first request message including instruction information to a mobile management device in the first mobile communication network, so that the mobile management device in the first mobile communication network sends a second request message to a mobile management device in a second mobile communication network when executing the location update according to the instruction information, where the second request message enables the mobile management device in the second mobile communication network to reset a periodic update timer and send a first accept message including a periodic update timer reset instruction of the second mobile communication network to the mobile management device in the first mobile communication network.

The processor 52 is further configured to, when the radio frequency transceiver 51 receives a second accept message including the periodic update timer reset instruction of the second mobile communication network and sent by the mobile management device in the first mobile communication network, reset the periodic update timer of the second mobile communication network according to the periodic update timer reset instruction of the second mobile communication network.

The method in the embodiment corresponding to FIG. 1, and the functions of the single-card dual-standby user equipment in the embodiments corresponding to FIG. 2, FIG. 3, and FIG. 4 may be implemented by the single-card dual-standby user equipment provided in this embodiment.

Optionally, as shown in FIG. 5, the single-card dual-standby user equipment according to this embodiment also includes: a display and a display controller 54 which are coupled to the processor.

The processor 52 is further configured to detect whether a location in the first mobile communication network changes or detect whether a periodic update timer of the first mobile communication network times out.

The single-card dual-standby user equipment provided in this embodiment implements a synchronous location update of the single-card dual-standby user equipment in the first mobile communication network and in the second mobile communication network, which can avoid a problem in the prior art that the single-card dual-standby user equipment is continually activated to execute the location update, thereby effectively reducing unnecessary electric energy loss of the single-card dual-standby user equipment.

Figure 6:
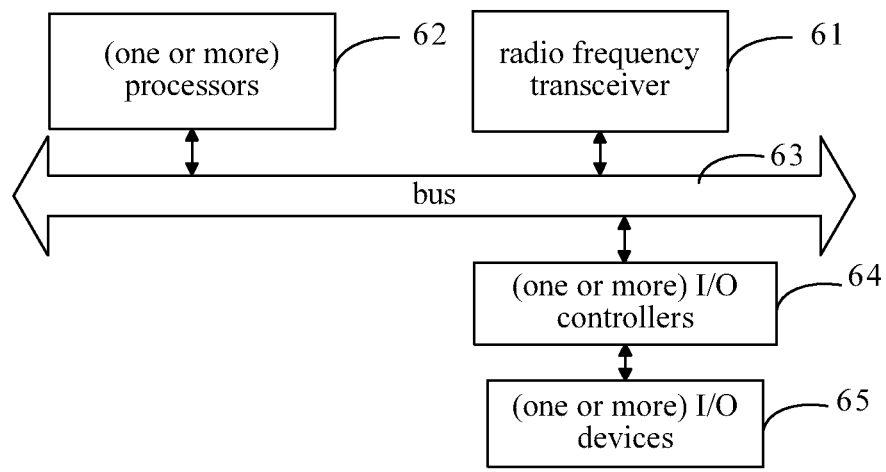
FIG. 6 is a schematic structural diagram of a mobile management device according to another embodiment of the present invention.

FIG. 6 is a schematic structural diagram of a mobile management device according to another embodiment of the present invention. As shown in FIG. 6, the mobile management device may include: at least one processor 62 and a radio frequency transceiver 61 which are coupled to each other through a bus 63.

The mobile management device may optionally include one or more input/output controllers 64 which are coupled to other components through the bus 63 to provide an interface for one or more input/output devices 65. The bus 63 may include one or more buses interconnected through various bridges, controllers, and/or adapters known in the art. An input/output device 65 may include a key area, a keyboard, a controller of a cursor, or a touchscreen.

The mobile management device of this embodiment includes: a radio frequency transceiver 61, and at least one processor 62 coupled to the radio frequency transceiver 61, where the processor 62 is configured to, when the radio frequency transceiver 61 receives a first request message including instruction information, where the first request message is sent by a single-card dual-standby user equipment when detecting that a location update needs to be performed in a first mobile communication network, execute the location update according to the instruction information, and trigger the radio frequency transceiver 61 to send a second request message to a mobile management device in a second mobile communication network, so that the mobile management device in the second mobile communication network resets a periodic update timer.

The radio frequency transceiver 61 is configured to send a second accept message including a periodic update timer reset instruction of the second mobile communication network to the single-card dual-standby user equipment when receiving a first accept message including the periodic update timer reset instruction of the second mobile communication network and sent by the mobile management device in the second mobile communication network, so that the single-card dual-standby user equipment resets the periodic update timer of the second mobile communication network according to the periodic update timer reset instruction of the second mobile communication network.

The method in the embodiment corresponding to FIG. 2, the mobile management device in the first mobile communication network in the embodiment corresponding to FIG. 1, and the functions of the target MME in the embodiment corresponding to FIG. 3 and of the target MSC in the embodiment corresponding to FIG. 4 may be implemented by the mobile management device provided in this embodiment.

The mobile management device provided in this embodiment implements a synchronous location update of the single-card dual-standby user equipment in the first mobile communication network and in the second mobile communication network, which can avoid a problem in the prior art that the single-card dual-standby user equipment is continually activated to execute the location update, thereby effectively reducing unnecessary electric energy loss of the single-card dual-standby user equipment.

Another embodiment of the present invention provides a location update system, which may include the single-card dual-standby user equipment according to the embodiment corresponding to FIG. 5 and the mobile management device according to the embodiment corresponding to FIG. 6. The location update system provided in another embodiment of the present invention implements a synchronous location update of the single-card dual-standby user equipment in the first mobile communication network and in the second mobile communication network, which can avoid a problem in the prior art that the single-card dual-standby user equipment is continually activated to execute the location update, thereby effectively reducing unnecessary electric energy loss of the single-card dual-standby user equipment.

It can be clearly understood by persons skilled in the art that, for the purpose of convenient and brief description, for a specific working process of the foregoing-described system, apparatus and unit, reference may be made to the corresponding process in the method embodiments, which is not repeatedly described here again.

In the embodiments provided in the present application, it should be understood that the disclosed system, apparatus, and method may be implemented in other manners. For example, the described apparatus embodiments are merely exemplary. For example, the unit division is merely logical function division and can be in another division manner in actual implementation. For example, multiple units or components can be combined or can be integrated into another system, or some features can be ignored or not performed. In addition, the displayed or discussed mutual couplings or direct couplings or communication connections may be indirect couplings or communication connections through some interfaces, apparatuses, or units and may be in electronic, mechanical or other forms.

The units described as separate parts may be or may not be physically separate, and parts displayed as units may be or may not be physical units, that is, may be located in one place, or may also be distributed onto multiple network elements. A part or all of the units may be selected according to the actual needs to achieve the objectives of the solutions of the embodiments.

In addition, function units in the embodiments of the present invention may be integrated into a processing unit, each of the units may also individually exist physically, and two or more units may also be integrated into a unit. The foregoing integrated unit may be implemented by adopting a form of hardware, and may also be implemented by adopting a form of hardware plus a software functional unit.

The integrated unit implemented in the form of the software functional unit may be stored in a computer readable storage medium. The software functional unit is stored in a storage medium, and includes several instructions which are used to instruct a computer device (which may be a personal computer, a server, or a network device) to perform the steps of the methods according to the embodiments of the present invention. The foregoing storage medium includes: any medium that can store program codes, such as a U disk, a removable hard disk, a read-only memory (ROM), a random access memory (RAM), a magnetic disk, or a compact disk.

Finally, it should be noted that the foregoing embodiments are merely used for describing the technical solutions of the present invention, and not intended to limit the present invention. Although the present invention is described in detail with reference to the foregoing embodiments, persons of ordinary skill in the art should understand that they can still make modifications to the technical solutions recorded in the foregoing embodiments, or make equivalent replacements to some technical features of the technical solutions in the embodiments, and these modifications or replacements do not make the essence of the corresponding technical solutions depart from the spirit and scope of the technical solutions of the embodiments of the present invention.

What is claimed is:

1. A location update method, comprising:
when detecting that a location update needs to be performed in a first mobile communication network, sending a first request message comprising instruction information to a mobile management device in the first mobile communication network such that the mobile management device in the first mobile communication network sends a second request message to a mobile management device in a second mobile communication network when executing the location update according to the instruction information, wherein the second request message enables the mobile management device in the second mobile communication network to reset a periodic update timer and send a first accept message comprising a periodic update timer reset instruction of the second mobile communication network to the mobile management device in the first mobile communication network;
receiving a second accept message sent by the mobile management device in the first mobile communication network, wherein the second accept message comprises the periodic update timer reset instruction of the second mobile communication network; and
resetting the periodic update timer of the second mobile communication network according to the periodic update timer reset instruction of the second mobile communication network.

2. The method according to claim 1, wherein detecting that the location update needs to be performed in the first mobile communication network comprises detecting a location change in the first mobile communication network.

3. The method according to claim 1, wherein detecting that the location update needs to be performed in the first mobile communication network comprises detecting timeout of a periodic update timer of the first mobile communication network.

4. The method according to claim 1, wherein the first request message is a tracking area update request message, and the second request message is a location update request message.

5. The method according to claim 1, wherein the first request message is a location area update request message, and the second request message is a tracking area update request message.

6. The method according to claim 1, wherein the instruction information is carried in an update type field or a newly added field of the first request message.

7. A location update method, comprising:
receiving a first request message comprising instruction information, where the first request message is sent by a single-card dual-standby user equipment when detecting that a location update needs to be performed in a first mobile communication network;
executing the location update according to the instruction information, and sending a second request message to a mobile management device in a second mobile communication network such that the mobile management device in the second mobile communication network resets a periodic update timer;
receiving a first accept message sent by the mobile management device in the second mobile communication network, wherein the first accept message comprises a periodic update timer reset instruction of the second mobile communication network; and
sending a second accept message comprising the periodic update timer reset instruction of the second mobile communication network to the single-card dual-standby user equipment such that the single-card dual-standby user equipment resets the periodic update timer of the second mobile communication network according to the periodic update timer reset instruction of the second mobile communication network.

8. The method according to claim 7, wherein the first request message is a tracking area update request message, and the second request message is a location update request message.

9. The method according to claim 7, wherein the first request message is a location area update request message, and the second request message is a tracking area update request message.

10. A single-card dual-standby user equipment, comprising:
a radio frequency transceiver; and
at least one processor coupled to the radio frequency transceiver,
wherein the processor is configured to,
when detecting that a location update needs to be performed in a first mobile communication network, trigger the radio frequency transceiver to send a first request message comprising instruction information to a mobile management device in the first mobile communication network such that the mobile management device in the first mobile communication network sends a second request message to a mobile management device in a second mobile communication network when executing the location update according to the instruction information, wherein the second request message enables the mobile management device in the second mobile communication network to reset a periodic update timer and send a first accept message comprising a periodic update timer reset instruction of the second mobile communication network to the mobile management device in the first mobile communication network; and
when the radio frequency transceiver receives a second accept message comprising the periodic update timer reset instruction of the second mobile communication network and sent by the mobile management device in the first mobile communication network, reset the periodic update timer of the second mobile communication network according to the periodic update timer reset instruction of the second mobile communication network.

11. The single-card dual-standby user equipment according to claim 10, further comprising a display and a display controller that are coupled to the processor, and wherein the processor is further configured to detect whether a location in the first mobile communication network changes.

12. The single-card dual-standby user equipment according to claim 10, further comprising a display and a display controller that are coupled to the processor, and wherein the processor is further configured to detect whether a periodic update timer of the first mobile communication network times out.

* * * * *